US012591225B2

(12) United States Patent
Kaur et al.

(10) Patent No.: US 12,591,225 B2
(45) Date of Patent: Mar. 31, 2026

(54) FACTORY DATA GENERATION WITH INTELLIGENT LABELLING

(71) Applicant: HITACHI, Ltd., Tokyo (JP)

(72) Inventors: Ravneet Kaur, San Jose, CA (US);
Joydeep Acharya, Milpitas, CA (US)

(73) Assignee: HITACHI, LTD., Tokyo (JP)

( * ) Notice: Subject to any disclaimer, the term of this patent is extended or adjusted under 35 U.S.C. 154(b) by 377 days.

(21) Appl. No.: 18/376,690

(22) Filed: Oct. 4, 2023

(65) Prior Publication Data

US 2025/0116996 A1 Apr. 10, 2025

(51) Int. Cl.
*G05B 19/418* (2006.01)

(52) U.S. Cl.
CPC ... *G05B 19/41865* (2013.01); *G05B 19/4188* (2013.01); *G05B 2219/40336* (2013.01)

(58) Field of Classification Search
CPC .......... G05B 19/41865; G05B 19/4188; G05B 2219/40336
See application file for complete search history.

(56) References Cited

U.S. PATENT DOCUMENTS

| | | | | |
|---|---|---|---|---|
| 11,017,690 B1 * | 5/2021 | Zia | ........................ | G06N 3/0442 |
| 2015/0356459 A1 * | 12/2015 | Ghosh | ...................... | G06N 5/02 |
| | | | | 706/12 |
| 2016/0239769 A1 * | 8/2016 | Modi | .............. | G06Q 10/06395 |
| 2020/0302232 A1 * | 9/2020 | Kilickaya | ................ | G06N 7/01 |

OTHER PUBLICATIONS

J. Ji, R. Desai and J. C. Niebles, "Detecting human-object relationships in videos," in Proceedings of the IEEE/CVF International Conference on Computer Vision, 2021, pp. 8106-8116.

* cited by examiner

*Primary Examiner* — Omer S Khan
(74) *Attorney, Agent, or Firm* — PROCOPIO, CORY, HARGREAVES & SAVITCH LLP

(57) ABSTRACT

Presented herein are systems and methods for receiving video data associated with at least one task performed by at least one worker and executing, based on the received video data, a human action recognition program to identify at least one action associated with the at least one task and executing an object detection program to identify at least one object associated with the at least one task, identifying, based on a combination of the identified at least one action and the identified at least one object associated with the at least one task, at least one subtask of the at least one task, and generating at least first and second labels for the identified at least one subtask based on at least first and second labels, respectively, associated from a first set of existing labels for identified actions and from a second set of existing labels for identified objects, respectively.

14 Claims, 13 Drawing Sheets

300

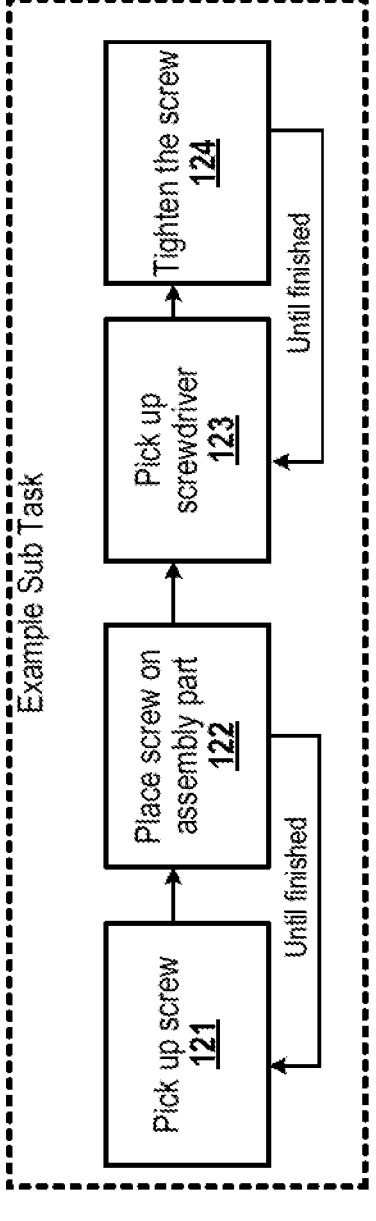
FIG. 2
(PRIOR ART)

| Product ID: AAAA | | |
|---|---|---|
| WorkCell ID: W0005 | | |
| Task #               530 | Task ID              540 | Task Description    550 |
| 1                    531 | T0001                541 | TD1                  551 |
| 2                    532 | T0002                542 | TD2                  552 |
| : | : | : |

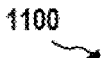
1100 receive, at the edge apparatus, the video data associated with the at least one task performed by the at least one worker
1121 execute, based on the received video data, a human action recognition program to identify at least one action associated with the at least one task
1122 execute, based on the received video data, an object detection program to identify at least one object associated with the at least one task
1123 identify, based on a combination of the identified at least one action and the identified at least one object associated with the at least one task, at least one subtask of the at least one task
1124 generate at least one label for the identified at least one subtask based on at least a first label associated with the at least one identified action from a first set of existing labels for identified actions and at least a second label associated with the identified at least one object from a second set of existing labels for identified objects
1125

FACTORY DATA GENERATION WITH INTELLIGENT LABELLING

BACKGROUND

Field

The present disclosure is generally directed to identifying specific subtasks within larger tasks for worker training and/or identification of human errors.

Related Art

In today's manufacturing landscape, there is a growing emphasis on worker training and the identification of human errors. To achieve these goals, factories need to identify specific subtasks within larger tasks. While tasks are well-defined within the Manufacturing Execution System (MES) software, subtask identification can prove to be challenging. One common approach to subtask identification is dividing the task into specific time intervals; however, this approach may not work as every worker may perform the same subtask at different intervals, and in different orders. As such, it is necessary to find more sophisticated methods of subtask identification that consider individual worker performance and order variability.

Tasks, in some aspects, may be specified in a work order from the MES system, but the subtasks are related to the human activity and their movements. FIG. 1 is a diagram 100 illustrating aspects of an industrial process including a product assembly task 120 related to a component 110 and related to screwing in the screws 111. The product assembly task 120, in some aspects, may be a task to be performed by a worker. The related subtasks may include the tasks of picking up a screw 121, placing a screw on the assembly part 122, picking up a screw driver 123, and tightening the screw 124 that may be repeated in the order shown in FIG. 1 until all the screws 410 are tightened. FIG. 2 is a diagram 200 illustrating that the related subtasks may be differently ordered by a different worker or at a different time. For example, diagram 200 illustrates that the tasks of picking up a screw 121 and placing a screw on the assembly part 122 may be repeated until all the screws 410 are placed on the component 110 and then the tasks of picking up a screw driver 123 and tightening the screw 124 may be repeated until all the screws 410 are tightened.

Detecting human-object relationships in videos is a crucial challenge in action recognition. In this context, some methods utilize video frames to identify the objects that a person interacts with and categorize the relationships between the person and the objects. The methods propose a model called the Human-Object Relationship Transformer (HORT) to solve this problem. The HORT model consists of two stages: static image prediction and feature extraction. These stages may be followed by intra-transformers and/or inter-transformers that conduct spatio-temporal reasoning. The HORT model integrates features from different instances across image planes and time steps, which allows it to eliminate false positive object proposals, identify active objects, and refine relationship classification.

In factory settings, tasks are generally well-defined by a MES system, but segmenting and labelling the subtasks performed by workers can be a complex undertaking. Dividing tasks into specific time intervals is a common approach to identify subtasks, but it may not always be effective, as workers may perform subtasks at different intervals and in varying orders as illustrated in FIGS. 1 and 2. Therefore, more sophisticated methods of subtask identification are required that consider individual worker performance and order variability.

SUMMARY

Example implementations described herein involve an innovative method to automatically identify subtasks from video data associated with a task performed by one or more workers, and generating labels associated with identified subtasks and the video data. The method may include using a pretrained human action recognition model with basic operations and an object detection model with manufacturing related objects to identify task change points (i.e. subtasks) from a task video. The subtasks may be labeled with a label from a set of labels gathered from the human action recognition and object detection. The labeled subtasks (or the text associated with the labeled subtasks) may be summarized into a task description. The summarized task description may be evaluated by comparison with the task description from the work order.

Aspects of the present disclosure include a method for receiving video data associated with at least one task performed by at least one worker and executing, based on the received video data, a human action recognition program to identify at least one action associated with the at least one task. The method may further include executing, based on the received video data, an object detection program to identify at least one object associated with the at least one task, identifying, based on a combination of the identified at least one action and the identified at least one object associated with the at least one task, at least one subtask of the at least one task, and generating at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory.

Aspects of the present disclosure include a non-transitory computer readable medium, storing instructions for execution by a processor, which can involve instructions for receiving video data associated with at least one task performed by at least one worker and executing, based on the received video data, a human action recognition program to identify at least one action associated with the at least one task. The instructions may further include instructions for executing, based on the received video data, an object detection program to identify at least one object associated with the at least one task, identifying, based on a combination of the identified at least one action and the identified at least one object associated with the at least one task, at least one subtask of the at least one task, and generating at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory.

Aspects of the present disclosure include a system, which can involve means for receiving video data associated with at least one task performed by at least one worker and executing, based on the received video data, a human action recognition program to identify at least one action associated with the at least one task. The means may further include means for executing, based on the received video data, an object detection program to identify at least one object associated with the at least one task, identifying, based on a combination of the identified at least one action and the identified at least one object associated with the at least one task, at least one subtask of the at least one task, and generating at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory.

Aspects of the present disclosure include an apparatus, which can involve a processor, configured to receive video data associated with at least one task performed by at least one worker and execute, based on the received video data, a human action recognition program to identify at least one action associated with the at least one task. The processor may further be configured to execute, based on the received video data, an object detection program to identify at least one object associated with the at least one task, identify, based on a combination of the identified at least one action and the identified at least one object associated with the at least one task, at least one subtask of the at least one task, and generate at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory.

BRIEF DESCRIPTION OF DRAWINGS

FIG. 2 is a diagram illustrating that the related subtasks may be differently ordered by a different worker or at a different time.

FIG. 5 shows the example task information table which is sent from the MES system to the respective edge analytics module.

FIG. 11 is a flow diagram illustrating a method in accordance with some aspects of the disclosure.

DETAILED DESCRIPTION

Figure 1:
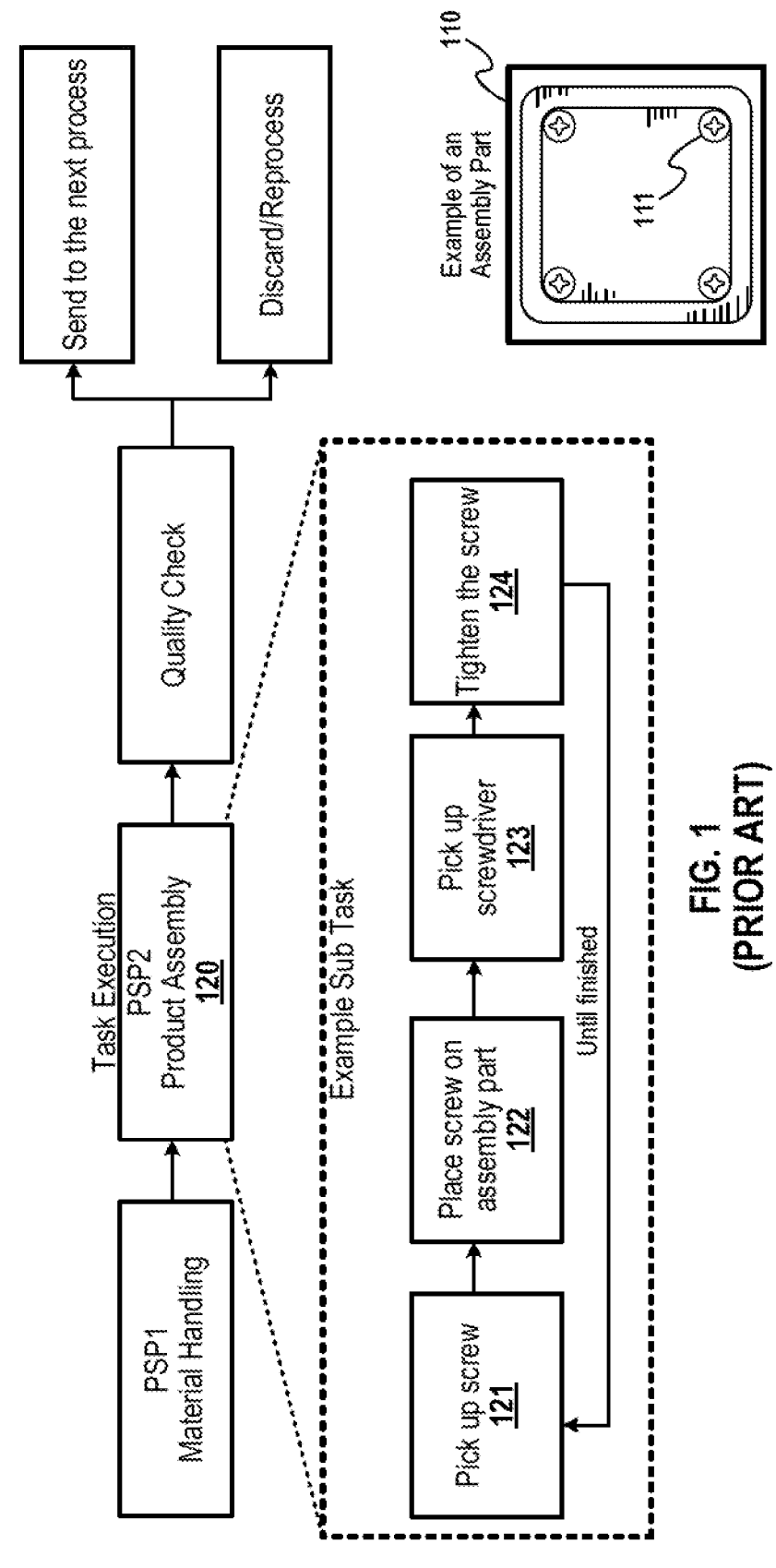
FIG. 1 is a diagram illustrating aspects of an industrial process including a product assembly task in accordance with some aspects of the disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Worker training and identifying human errors are becoming increasingly important in the modern manufacturing landscape. To achieve these objectives, factories need to identify specific subtasks within larger tasks. Although tasks are well-defined within the MES software, identifying subtasks can be difficult. Dividing tasks into specific time intervals is a common approach to subtask identification, but it may not always be effective since workers may perform subtasks at different intervals and in varying orders. Therefore, this novel approach provides a solution of automatically identifying subtask and provides suitable labels to each of the subtasks.

Figure 3:
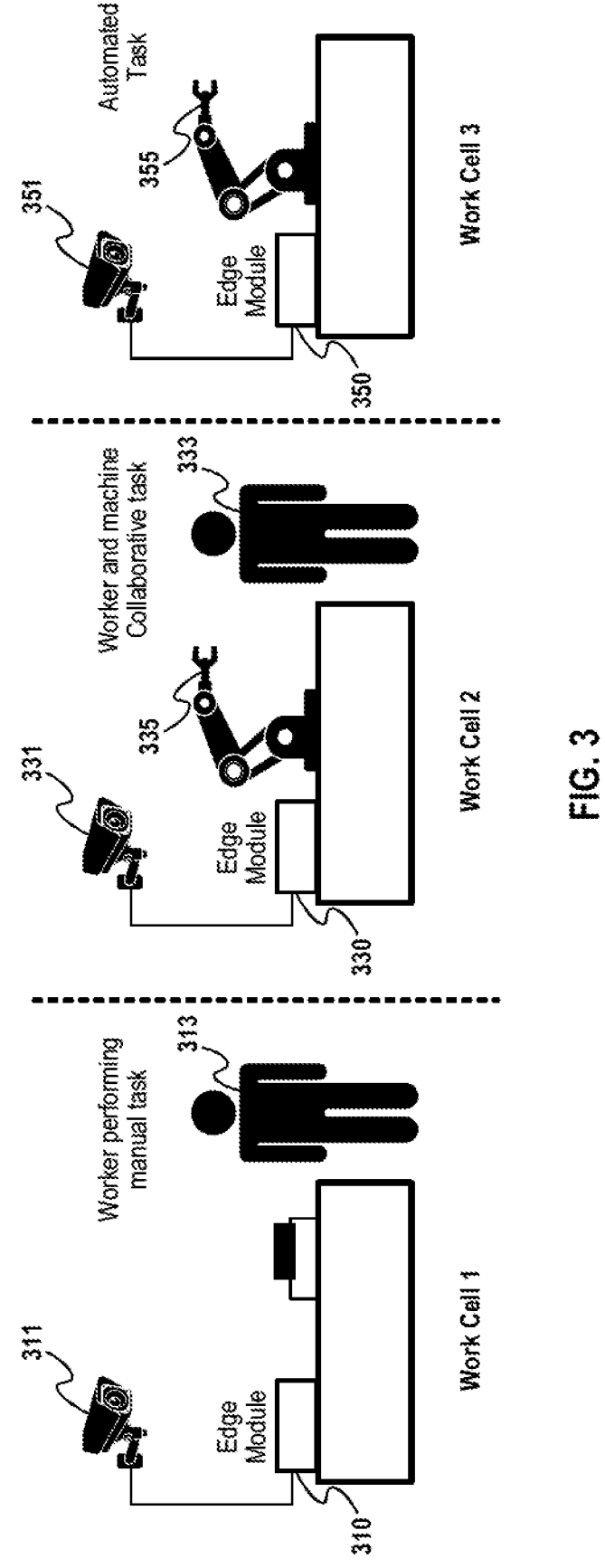
FIG. 3 is a diagram illustrating three work cells in a factory in accordance with some aspects of the disclosure.

FIG. 3 is a diagram 300 illustrating three work cells (or workstations) in a factory in accordance with some aspects of the disclosure. For example, in a first area, e.g., work cell 1, a first human worker 313 may be performing a manual task (such as assembly) and a camera 311 may capture the worker movements and store that data onto edge module 310. Similarly, in a second work area, e.g., a work cell 2, a second human worker 333 is working alongside a robotic arm 335 to complete a collaborative task. Here as well, the camera 331 may capture the videos of worker movement and robotic movement, and store and process that data in edge module 330. A third work area, e.g., the work cell 3, on the other hand may include a robotic arm 355 and may not include a human worker which is performing an automated task. Similar to elements in the first and second work areas, the third work area may include a camera 351 that may capture the movement of robotic arm 355 and may store and process that data in edge module 350. Accordingly, FIG. 3 provides an illustration of three scenarios including two scenarios, e.g., associated with the first two work areas (i.e., work cell 1 and work cell 2), for which there is a likelihood of manual error based on the participation of the human worker, e.g., the first human worker 313 or the second human worker 333. FIG. 3 further illustrates a third scenario, e.g., associated with the third work area (i.e., work cell 3), for which the task is automated and the likelihood of manual error is reduced (assuming the automation has been properly configured).

Figure 4:
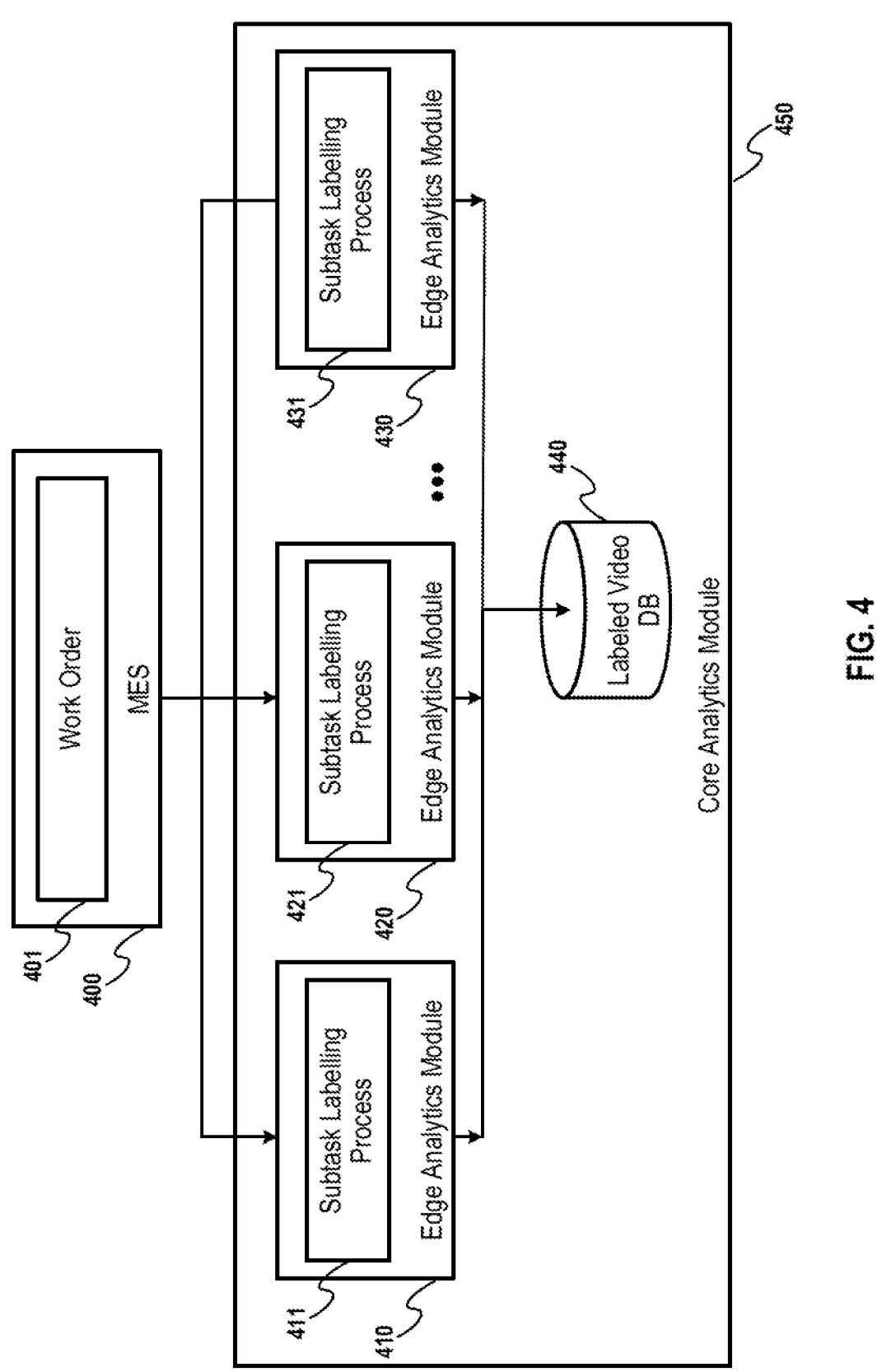
FIG. 4 showcases an overview of architecture where a work order is provided by the MES in accordance with some aspects of the disclosure.

FIG. 4 showcases an overview of architecture where a work order 401 is provided by the MES 400. The MES 400, in some aspects, may be a software-based system implemented by one or more computer devices (e.g., a computer device 1305 of FIG. 13 discussed below) used to manage and control a production process in a manufacturing environment. The MES 400, in some aspects, may provide real-time information about the production process, allowing manufacturers to monitor and optimize production activities and make more informed decisions. An MES typically includes a range of functions such as production scheduling, quality management, resource allocation, inventory management, and performance analysis. An MES can help manufacturers to reduce costs, increase efficiency, and improve quality. By providing real-time data and analytics, manufacturers can identify areas where production can be improved and take corrective actions to optimize their operations. In some aspects, an MES can also help manufacturers to track and trace products throughout the production process, ensuring that products meet quality standards and regulatory requirements.

The MES 400, in some aspects, may be connected to a core analytics module 450 which collects data from a set of edge analytics modules (or from a set of edge analytics programs) (e.g., edge analytics module 410, edge analytics module 420, and edge analytics module 430) residing in, or associated with, respective work cells. The core analytics module 450, in some aspects, may process an individual work order 401 coming from the MES 400. In each edge analytics module (edge analytics modules 410, 420, and 430), a subtask labelling module (e.g., subtask labelling module 411, subtask labelling module 421, or subtask labelling module 431) may process videos received from a related recording device (e.g., one of the cameras 311, 331, or 351, respectively) and may identify, and provide an indication of, a series of subtasks related to, or that make up, a task performed by a worker. The subtask labelling modules (e.g., subtask labelling modules 411, 421, or 431) may further (automatically) generate labels for each of the subtasks.

The identified and labeled subtasks may then be associated with the video from which they were derived to generate a set of labeled video data (e.g., modified video data associated with metadata identifying the subtasks, time stamps associated with the subtasks, and corresponding labels). An edge analytics module (e.g., edge analytics modules 410, 420, or 430), in some aspects, may provide the set of labeled video data to a connected labeled video database (DB) 440 which stores all the videos and respective labels for each video received from the set of edge analytics modules (e.g., edge analytics modules 410, 420, or 430).

FIG. 5 shows the example task information table which is sent from the MES 400 to the respective edge analytics module. This table consist of the product identification (ID) 510, work cell ID 520, and the task information using a task number field 530, a task ID field 540, and a task description field 550. For example, for a product AAAA identified by product ID 510 a set of tasks may be specified in an ordered list identifying a first task 531 and a second task 532. The first task 531 in the ordered list (or the second task 532) may be associated with corresponding task ID 541 (or 542). Additionally, or alternatively, a task description 551 (or 552) which describes the type of task and what it entails or includes, in some aspects, may also be associated with a particular task, or task ID. For example, a task description 551 from a work order could be "Assemble part A on part C by tightening screw 1". The table illustrated in FIG. 5, or other data structure in accordance with a particular implementation, may be generated by the MES 400 in some aspects. The MES 400, in some aspects, may provide the information about the tasks performed in a particular work cell (e.g., the task ID and task description associated with a current task, or the ordered list of task ID and task description for the corresponding ordered list of tasks associated with a particular product ID 510) to a corresponding edge analytics module (e.g., one of edge analytics module 410, 420, or 430 of FIG. 4).

Figure 6:
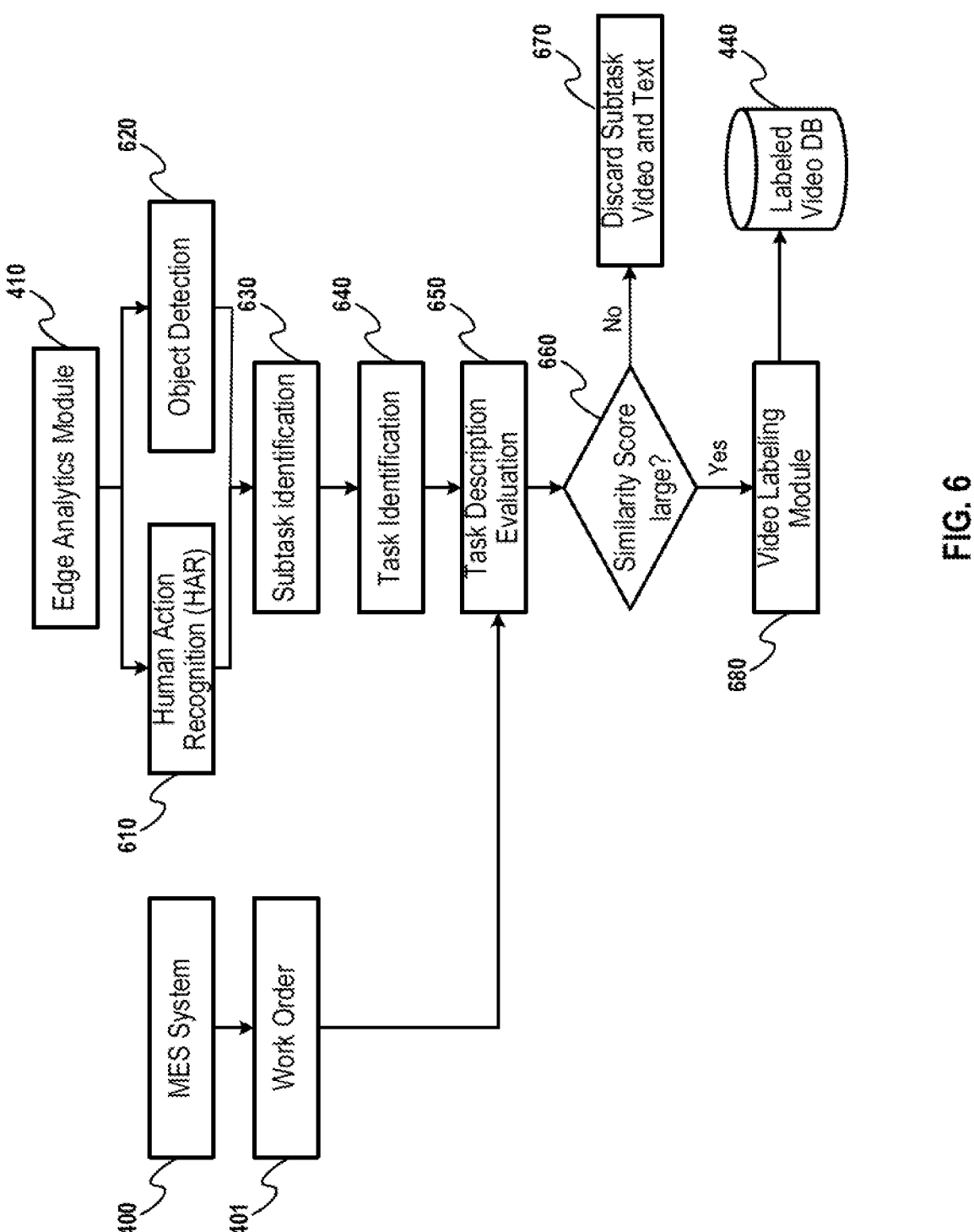
FIG. 6 showcases the process of subtask labelling where an edge analytics module implements a human activity recognition (HAR) program and the object detection program.

FIG. 6 showcases the process of subtask labelling in accordance with some aspect of the disclosure. For example, an edge analytics module 410, e.g., or one of edge analytics module 420 or 430 of FIG. 4, in some aspects, may execute a HAR program 610 (or includes a HAR module) and an object detection program 620 (or includes an object detection module). The HAR program 610, in some aspects, may be a pre-trained model that can recognize, from a video or video data, basic actions such as pick, place, reach, etc. The object detection program 620, in some aspects, may be a pre-trained model that can recognize, from a video or video data, objects for a specific factory, task, or product and can also recognize common objects such as screws, screw drivers, hammers, or other common tools, fasteners, or parts. These two programs, HAR program 610 and object detection program 620 may be connected to, may provide the results of the action or object recognition to, the subtask identification program 630 (e.g., a program or module executed by, or included in one of the subtask labelling modules, e.g., subtask labelling modules 411, 421, or 431 of FIG. 4). In some aspects, the subtasks may be identified using the set of recognized actions and the objects associated with each action. For example, the HAR program 610 may identify a "pick" action associated with a certain set of video frames or timestamps and the object detection program 620 may identify a screwdriver object at a same, or overlapping set of video frames of timestamps, leading the subtask identification program 630 to identify a subtask of "picking up a screwdriver." The subtask identification program 630, in some aspects, may identify change points, and corresponding labels applied between each identified change point, associated with a task video. In some aspects, the subtask identification program 630 may provide the identified change points and corresponding labels to a task identification process 640 where a summary of a task is generated from these subtasks labels using natural language processing (NLP). Furthermore, a task description is also provided from the MES 400 through a work order 401 to each edge analytics module. The task description from work order 401, in some aspects, may be compared with the task description from task identification process 640 and a similarity score may be generated by task description evaluation module 650. If, at 660, the similarity score is determined to be larger than a threshold similarity score, the videos analyzed by the HAR program 610, the object detection program 620, the subtask identification program 630, and the task identification process 640 may be labeled (e.g., associated with the change points and the subtask labels) based on the video labelling module 680 and stored in the labeled video DB 440. If, at 660, the similarity score is determined to be less than the threshold similarity score, the subtask video and labels may be discarded, at 670, without being stored in the labeled video DB 440. In some aspects, the video may be provided to a human user, such as a subject matter expert, to label the subtasks for use in subsequent training of a subtask labeling model.

Figure 7:
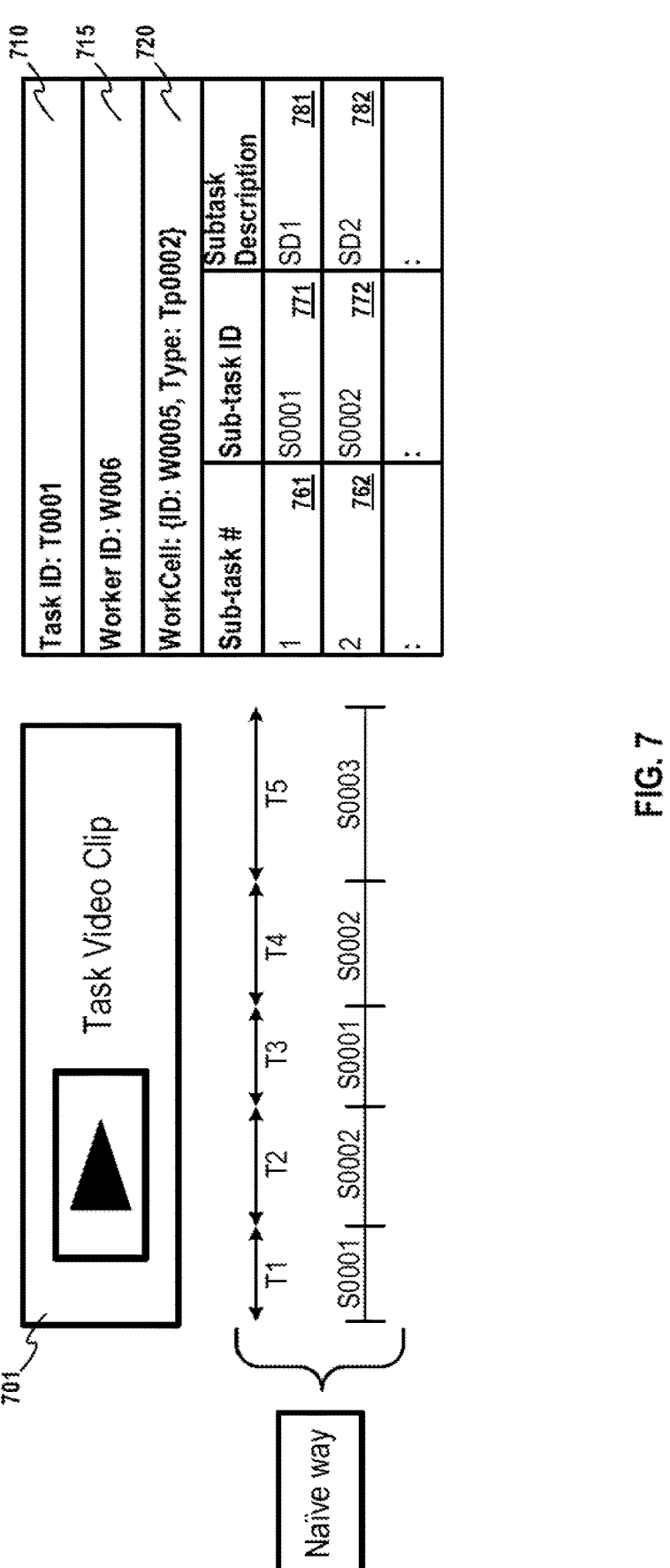
FIG. 7 illustrates an example for subtask identification in accordance with some aspects of the disclosure.

FIG. 7 illustrates an example for subtask identification in accordance with some aspects of the disclosure. For example, the subtask identification may be performed by one or more subtask identification module, e.g., subtask labelling modules 411, 421, and/or 431 of FIG. 4. The subtask identification, in some aspects, may involve dividing a video clip into a set of (pre-configured) intervals, e.g., [T1, T5]. In some aspects, the subtask identification may include, based on the change points (e.g., the boundaries between the intervals) in the video clip, and identifying corresponding subtasks [S0001, S0002, S0001, S0002, S0003]. This type of method of dividing a video clip based on the specific (e.g., pre-configured) time-periods may be a naïve method (e.g., a seemingly reasonable first approximation that breaks down in a real world application) as every worker may perform the same subtask at different time intervals (some one worker may take 1 see while the other may take 1.5 secs). Furthermore, the order of the subtask may not be the same for each worker.

FIG. 7 further shows an example subtask identification table that can be generated for a particular task 710 performed by a particular worker 715 in a particular work cell 720 after the subtasks (e.g., subtask 761 or subtask 762) have been identified (e.g., by a subtask ID 771 or subtask ID 772) and a subtask description (or label) (e.g., subtask description 781 or subtask description 782) has been identified for, or associated with, that subtask.

Figure 8:
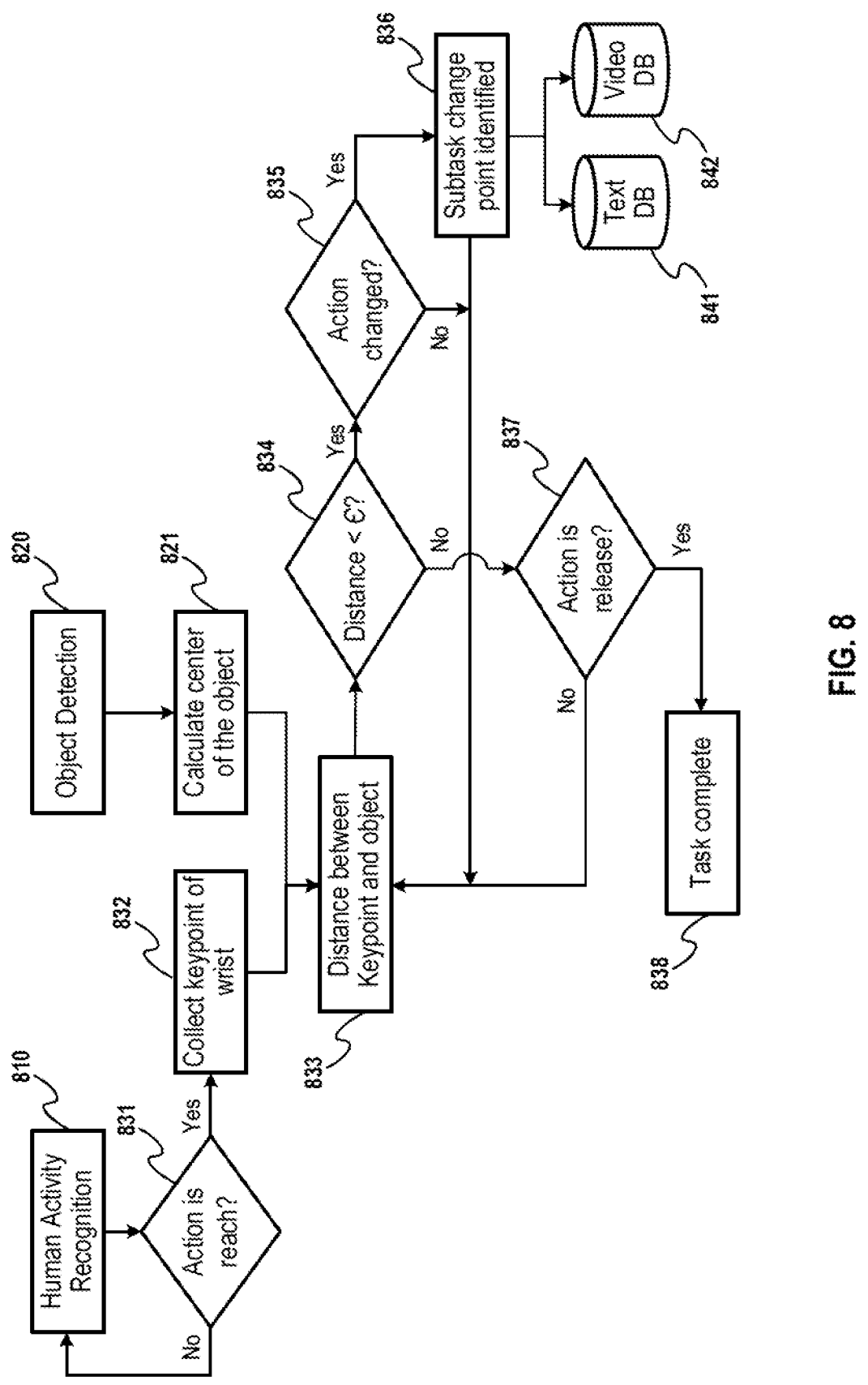
FIG. 8 shows a flow diagram associated with the subtask identification module in accordance with some aspects of the disclosure.

FIG. 8 shows a flow diagram associated with the subtask identification program 630 in accordance with some aspects of the disclosure. For the flow diagram illustrated in FIG. 8, it is assumed that the human worker is mainly working with their hand, and the relevant determination accordingly relate to wrist position and hand movement, but other applications may use different indicators of actions taken by the human worker. The HAR program 810 module, in some aspects, may observe and/or analyze the hand movement and may monitor for and determine, at 831, that there has been a reach action. When the reach action is detected at 831, data regarding the wrist keypoints may be collected and/or determined at 832. At the same time, the object detection program 820 (e.g., corresponding to object detection program 620) may also process the objects in the vicinity of the wrist and an objects center may be calculated at 821. Thereafter, the distance between the wrist keypoint collected and/or determined at 832 and the objects center calculated at 821 may be calculated at 833. If the distance calculated at 833 is determined, at 834, to be less than a threshold distance, e.g., epsilon ($<\epsilon$), in some aspects, the process (e.g., the subtask identification program 630) may continue by determining, at 835, if there has been a change in action. If the action is determined, at 835, to have changed (such as from reach to pick up) then subtask change point may be identified at 836. Based on the identification, the text associated with the object may be stored in the text DB 841 and the text associated with the action may be stored in label DB 842 (e.g., with a common identifier or some other indication of a correspondence between the data stored in the text DB 841 and the label DB 842). However, if the distance calculated at 833 is determined, at 834, to be more than the epsilon, in some aspects, it may be determined, at 837 if a release action is detected. If, at 837, it is determined that the release action has been detected, then the task is identified as being completed at 838. If either the action is determined to have been changed at 835 or the subtask change point has been identified at 836, the distance between the wrist keypoint collected and/or determined at 832 and the objects center calculated at 821 may be calculated (e.g., for a subsequent time) at 833 and the process may continue to completion at 838 (e.g., a determination, at 837, that the release action has been detected).

Figure 9:
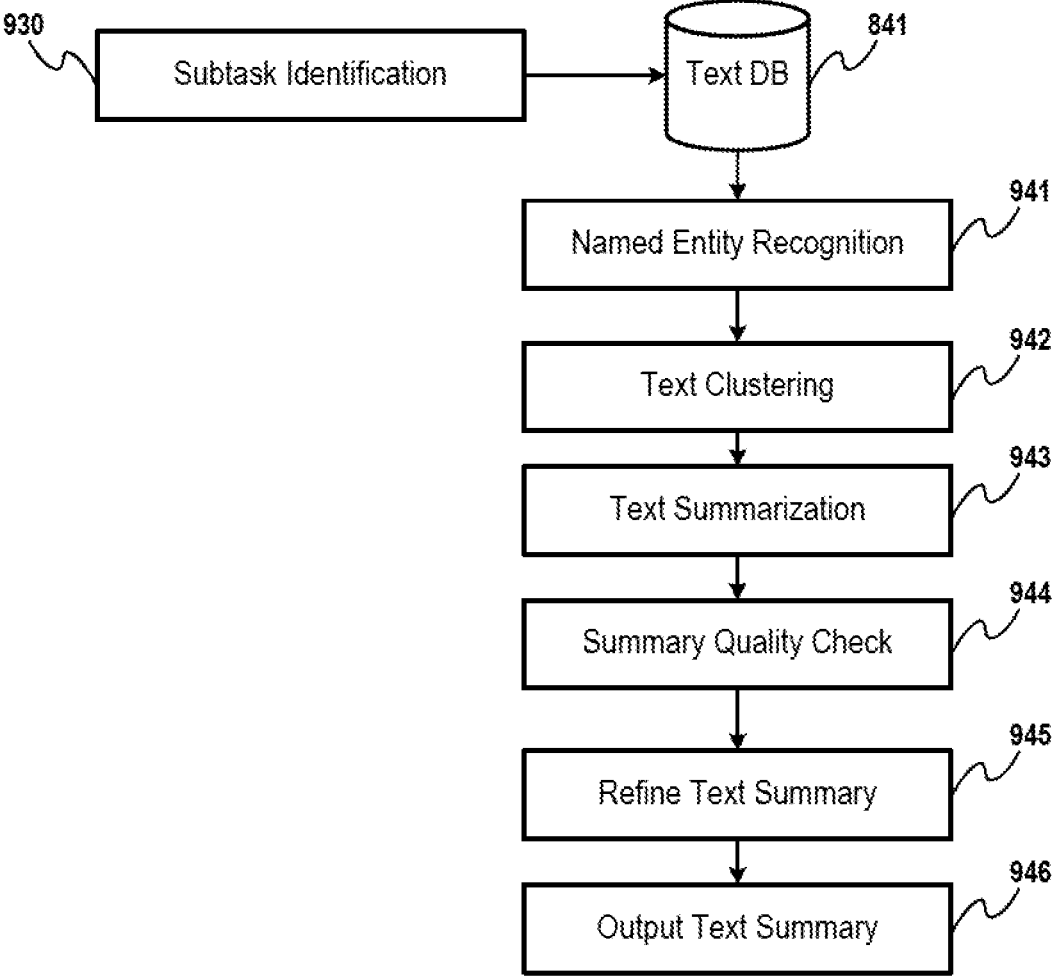
FIG. 9 shows a flow diagram associated with the task identification in accordance with some aspects of the disclosure.

FIG. 9 shows a flow diagram associated with the task identification process 640 in accordance with some aspects of the disclosure. For example, a text from text DB 841 associated with the subtask identification program 930 (e.g., corresponding to subtask identification program 630) may be passed through the named entity recognition module at 941 (as used herein, a module may refer to a program or sub-program associated with a program or process, e.g., task identification process 640) where key entities may be identified and extracted from the texts such as object names, actions, or other entities/labels as appropriate for the particular analysis task. Thereafter, a text clustering module may, at 942, process texts based on a model trained such that texts that are similar in ideas or concepts are grouped together. The text, after processing by the text clustering module at 942 may be processed by a text summarization algorithm at 943. The text summarization algorithm applied at 943, in some aspects, may be an extractive or abstractive summarization to generate a summary from the grouped text(s) that result from the processing by the text clustering module at 942. The summarized text may be expected to describe the overall task based on the subtasks and may be used to evaluate how well the subtask identification and labelling was performed. After the text has been summarized by the text summarization algorithm at 943, a text evaluation algorithm may be used, at 944, to evaluate the quality of the summary. For example, in some aspects, the text evaluation algorithm may be carried out at 944 by checking the quality of summary using a Recall-Oriented Understudy for Gisting Evaluations (ROUGE) metric. In some aspects, the summary may, at 945, be refined by a refinement process by adjusting the parameters or optimizing the algorithms etc. After the refinement at 945, the summarized text may be output at 946 for further evaluation.

Figure 10:
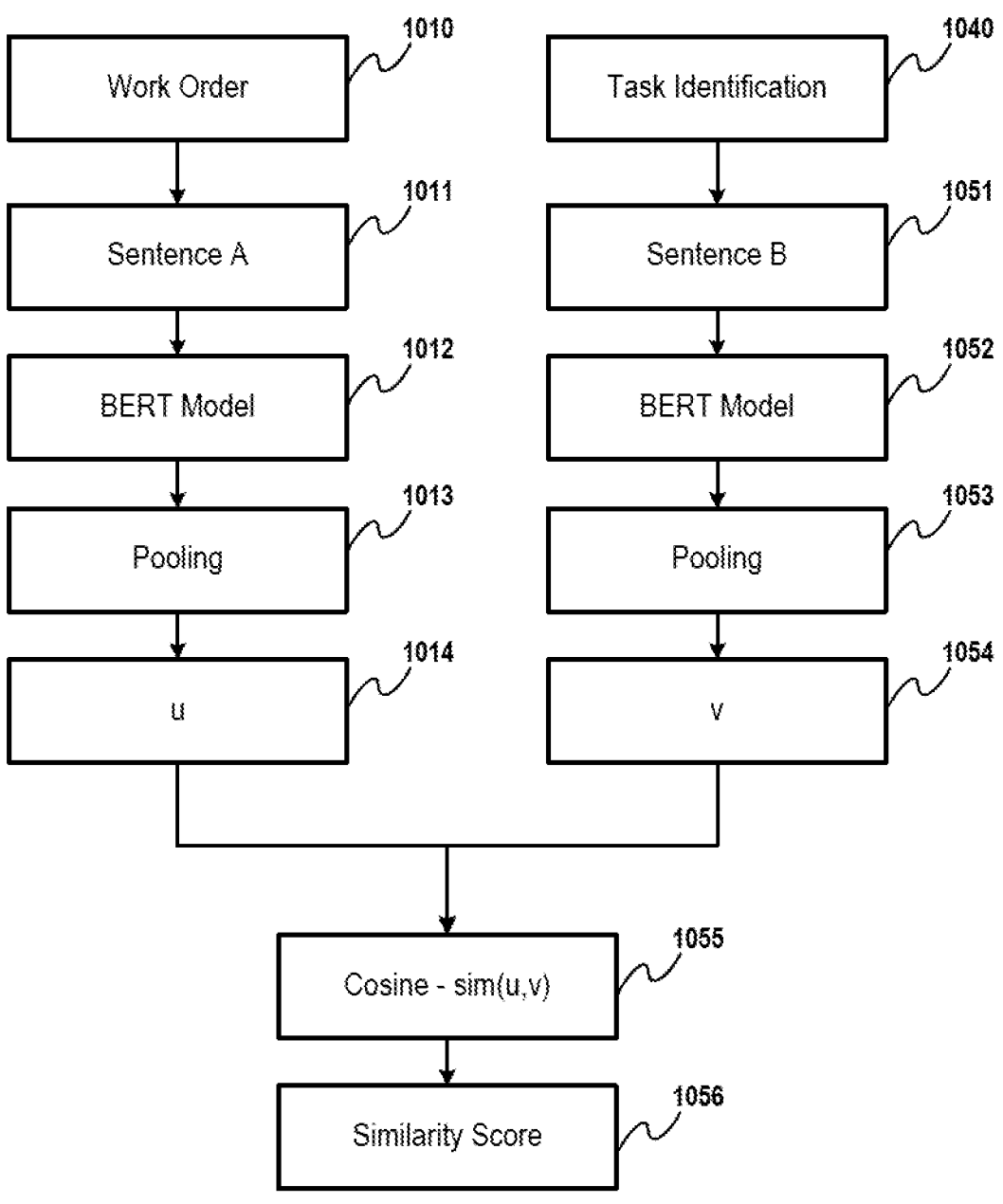
FIG. 10 provides details on the task description evaluation in accordance with some aspects of the disclosure.

FIG. 10 provides details on the task description evaluation module 650 in accordance with some aspects of the disclosure. In some aspects, a task description (e.g., Sentence A 1011) from work order 1010 (e.g., corresponding to work order 401) and the task description (e.g., Sentence B 1051) from task identification module 1040 (e.g., corresponding to task identification process 640) are passed through the BERT (bidirectional encoder representation from Transform) model 1012 and the BERT model 1052 respectively. In some aspects, BERT provides embeddings for all the words in the sentence. Thereafter, these embeddings from BERT models are passed through a pooling operation (e.g., at 1013 and 1053, for Sentence A 1011 and Sentence B 1051, respectively). For example, the pooling at 1013 and/or 1053 may include an averaging of all the words or some other appropriate processing. After pooling at 1013 and/or 1053, in some aspects, a single vector representation u may be generated at 1014 and a single vector representation v may be generated at 1054 for each sentence, respectively. At 1055, a similarity may be calculated between the single vectors (e.g., u and v). For example, a cosine similarity may be calculated at 1055 between the two single vectors (e.g., u and v) and the similarity score may be stored at 1056.

FIG. 11 is a flow diagram 1100 illustrating a method in accordance with some aspects of the disclosure. In some aspects, the method is performed by an edge apparatus (e.g., edge modules 310, 330, 350; edge analytics module 410, 420, 430; or computer device 1305) that may be a part of a system also including a video recording device (e.g., cameras 311, 331, 351) and/or an analysis apparatus (e.g., core analytics module 450 or computer device 1305) that may perform various analyses of recorded data, store automatically labeled recorded data, and present the results of the analysis for display to a user. For example, the video recording device may record video data associated with at least one task performed by at least one worker. The at least one task, in some aspects, may be a pre-defined task associated with an industrial process. Each task of the at least one task, in some aspects, may be associated with a corresponding set of subtasks. In some aspects, the corresponding sets of subtasks may be different (e.g., may be differently ordered) for each task, even if the task is associated with a same work order (e.g., a product assembly) as described above at least in relation to FIGS. 1 and 2.

Figure 13:
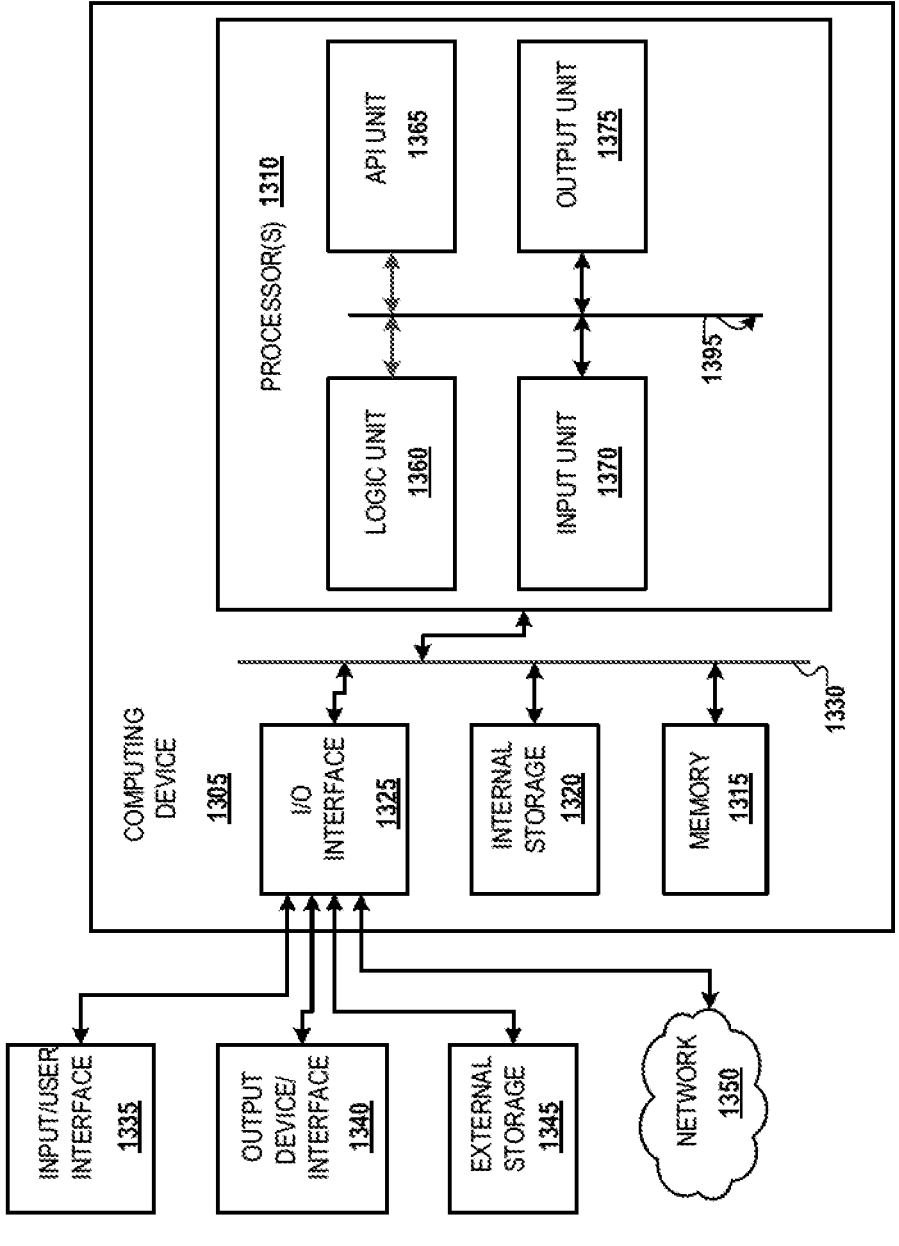
FIG. 13 illustrates an example computing environment with an example computer device suitable for use in some example implementations.

The video recording device, in some aspects, may provide, to the edge apparatus, the video data associated with the at least one task performed by the at least one worker. For example, the camera 311 may provide video data (e.g., video data 701) to the edge module 310. Referring to FIG. 13, for example, an input device such as a camera may provide video data via a user interface 1335 (or via a network 1350 and/or an I/O interface 1325) to a computer device 1305 associated with (or implementing) an edge module.

At 1121, the apparatus (e.g., the edge apparatus) may receive, from the video recording device, the video data associated with the at least one task performed by the at least one worker. For example, the edge module 310 may receive video data (e.g., video data 701) from camera 311. Referring to FIG. 13, for example, a computer device 1305 associated with (or implementing) an edge module (or edge apparatus) may receive video data via a user interface 1335 (or via a network 1350 and/or an I/O interface 1325) from a related input device such as a camera.

At 1122, the apparatus (e.g., the edge apparatus) may execute, based on the received video data, a human action recognition program to identify at least one action associated with the at least one task. For example, the human action recognition program may be executed by the processor(s) 1310 (e.g., singly or in combination) or the edge analytics module 410 (or 420 or 430) implementing and/or including, e.g., HAR program 610 or 810. In some aspects, the identified at least one action may be associated with at least one of a hand of the at least one worker or a wrist of the at least one worker. The identified at least one action, in some aspects, may include one or more of reaching for an object, picking up the object, releasing the object, pushing the object, lifting the object, pulling the object, carrying the object, or twisting the object (as examples of possible actions, where other actions may be identified based on the particular task being performed by the human worker).

At 1123, the apparatus (e.g., the edge apparatus) may execute, execute, based on the received video data, an object detection program to identify at least one object associated with the at least one task. For example, the object detection program may be executed by the processor(s) 1310 (e.g., singly or in combination) or the edge analytics module 410 (or 420 or 430) implementing and/or including, e.g., object detection program 620 or 820. In some aspects, the object may be one of a tool (e.g., a screwdriver, hammer, wrench, etc.), fastener (e.g., screw, dowel, nut/bolt, etc.), or part, (panel, housing, etc.) associated with the at least one task.

At 1124, the apparatus (e.g., the edge apparatus) may identify, based on a combination of the identified at least one action and the identified at least one object associated with the at least one task, at least one subtask of the at least one task. For example, identifying the at least one subtask of the at least on task may be performed by the processor(s) 1310 (e.g., singly or in combination) or the edge analytics module 410 (or 420 or 430) including and/or implementing, e.g., the subtask identification program 630. In some aspects, to identify the at least one subtask of the at least one task, apparatus (e.g., edge apparatus) may be configured to identify one of a beginning or an end of the at least one subtask based on a distance of the at least one of the hand of the at least one worker or the wrist of the at least one worker from at least one identified object.

At 1125, the apparatus (e.g., the edge apparatus) may generate at least one label for the identified at least one subtask based on at least a first label associated with the at least one identified action from a first set of existing labels for identified actions and at least a second label associated with the identified at least one object from a second set of existing labels for identified objects. For example, the generating the at least one label may be performed by the processor(s) 1310 (e.g., singly or in combination) or the edge analytics module 410 (or 420 or 430) implementing, e.g., the subtask labelling module 411 (or 421, or 431) and/or the task identification process 640. In some aspects, the first set of existing labels and the second set of existing labels are stored in a memory associated with the apparatus (e.g., memory 1315, external storage 1345, or text DB 841).

In some aspects, the apparatus (e.g., the edge apparatus) may calculate a similarity score between the generated at least one label and a task description provided for the pre-defined task. For example, calculating the similarity score may be performed by the processor(s) 1310 (e.g., singly or in combination) or the edge analytics module 410 (or 420 or 430) including and/or implementing, e.g., task description evaluation module 650, task identification module 1040, the BERT model applied at 1012 and/or at 1052, a pooling at 1013 and/or at 1053, a single vector representation generation at 1014 and/or at 1054 for each sentence respectively, calculating the cosine similarity at 1055 between the two single vectors, and storing the similarity score at 1056. The similarity score, in some aspects, may be calculated using any language model capable of assessing the similarity of phrases and or natural language descriptions of tasks or subtasks.

In some aspects, the apparatus (e.g., the edge apparatus) may determine whether to store or discard the generated at least one label for further analysis based on the calculated similarity score. For example, the determination may be performed by the processor(s) 1310 (e.g., singly or in combination) or the edge analytics module 410 (or 420 or 430) including and/or implementing the determination at 660. In some aspects, the determination may include determining whether the similarity value is above or below a threshold value.

In some aspects, the apparatus (e.g., the edge apparatus) or a related apparatus (e.g., the analysis apparatus) may analyze a set of generated labels for subtasks of the at least one task for each of a plurality of workers performing the at least one task to determine the optimal subtask ordering associated with performing the at least one task. Referring to FIG. 13, for example, an additional computer device 1305 associated with (or implementing) an analysis module (or analysis apparatus), e.g., a set of additional processor(s) 1310 (e.g., singly or in combination) or the core analytics module 450 including and/or implementing the edge analytics module 410 (or 420 or 430), may analyze the set of generated labels. In some aspects, the analysis may compare information associated with different workers or different analyzed videos for a particular task (e.g., for a particular task 710) to determine an ordering of subtasks (e.g., subtask 761 or 762) associated with a minimum average time, a maximum number of parts produced per shift, or some other parameter used to optimize the particular task.

In some aspects, the apparatus (e.g., the edge apparatus) or a related apparatus (e.g., the analysis apparatus) may generate and store a modified video data associated with the at least one task performed by the at least one worker. For example, generating and storing the modified video data may be performed by the processor(s) 1310 (e.g., singly or in combination) or the core analytics module 450 including and/or implementing the edge analytics module 410 (or 420 or 430). The modified video data, in some aspects, may include the received video data and metadata indicating the generated at least one label and a timestamp associated with one or more of a beginning of the identified at least one subtask, an end of the identified at least one subtask, or a duration of the identified at least one subtask. In some aspects, the analysis apparatus may analyze the set of generated labels for the subtasks of the at least one task for each of the plurality of workers performing the at least one task by analyzing the modified video data. Storing the modified video data, in some aspects, may include providing the modified video data to a common memory associated with the analysis apparatus.

In some aspects, the apparatus (e.g., the edge apparatus) or a related apparatus (e.g., the analysis apparatus) may present, via a display, a visual representation of the optimal subtask ordering. For example, the presentation may be performed by the processor(s) 1310 (e.g., singly or in combination) or the core analytics module 450 including and/or implementing the edge analytics module 410 (or 420 or 430) via the I/O interface 1325 and/or output device/interface 1340.

Figure 12:
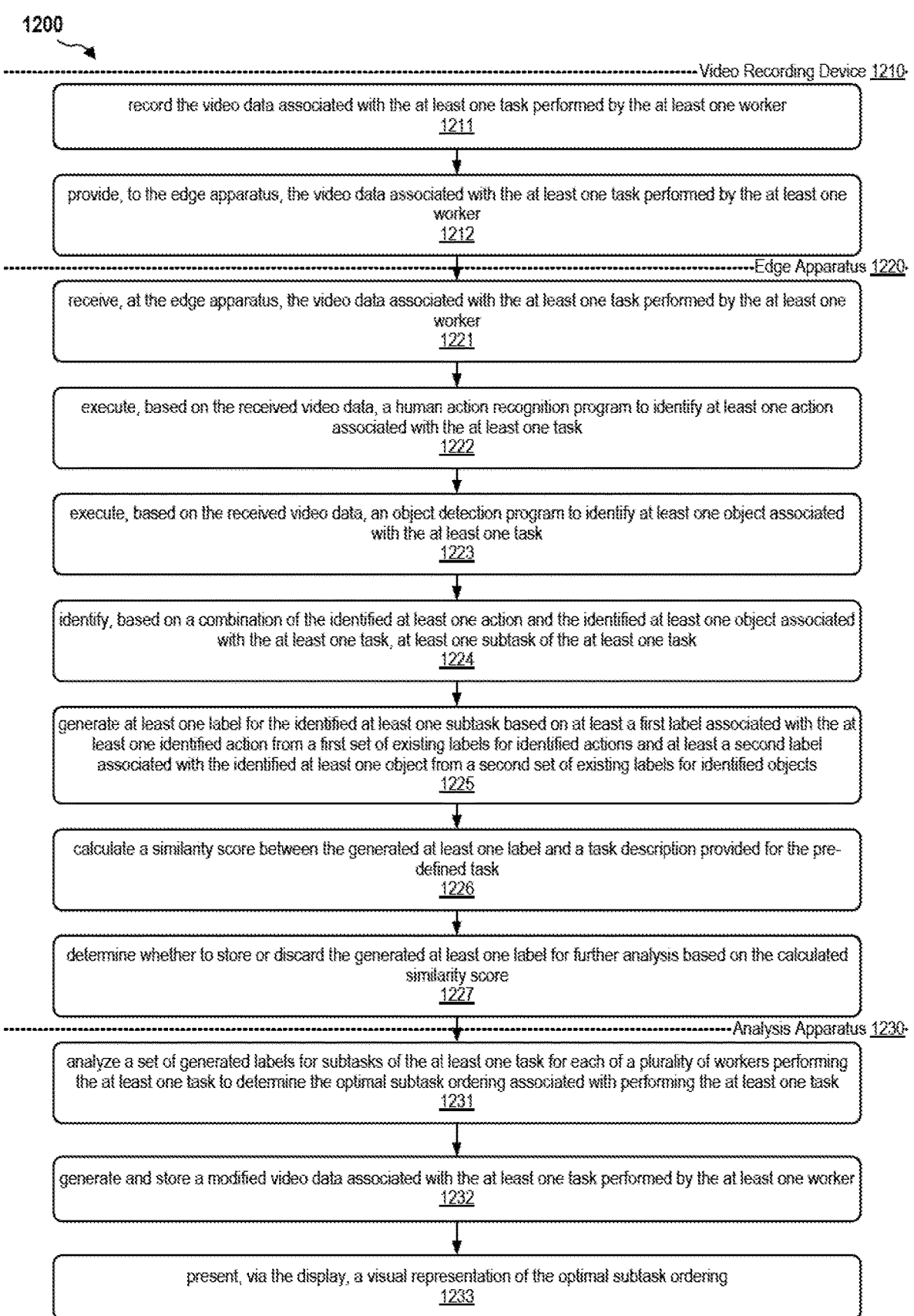
FIG. 12 is a flow diagram illustrating a method in accordance with some aspects of the disclosure.

FIG. 12 is a flow diagram 1200 illustrating a method in accordance with some aspects of the disclosure. In some aspects, the method is performed by a system including a video recording device 1210 (e.g., cameras 311, 331, 351), an edge apparatus 1220 (e.g., edge modules 310, 330, 350; edge analytics module 410, 420, 430; or computer device 1305), and/or an analysis apparatus 1230 (e.g., core analytics module 450 or computer device 1305) that may perform various analyses of recorded data, store automatically labeled recorded data, and present the results of the analysis for display to a user. At 1211, the apparatus (e.g., the video recording device 1210) may record video data associated with at least one task performed by at least one worker. The at least one task, in some aspects, may be a pre-defined task associated with an industrial process. Each task of the at least one task, in some aspects, may be associated with a corresponding set of subtasks. In some aspects, the corresponding sets of subtasks may be different (e.g., may be differently ordered) for each task, even if the task is associated with a same work order (e.g., a product assembly) as described above at least in relation to FIGS. 1 and 2.

At 1212, the apparatus (e.g., the video recording device 1210) may provide, to the edge apparatus 1220, the video data associated with the at least one task performed by the at least one worker. For example, the camera 311 may provide video data (e.g., video data 701) to the edge module 310. Referring to FIG. 13, for example, an input device such as a camera may provide video data via a user interface 1335 (or via a network 1350 and/or an I/O interface 1325) to a computer device 1305 associated with (or implementing) an edge module.

At 1221, the apparatus (e.g., the edge apparatus 1220) may receive, from the video recording device 1210, the video data associated with the at least one task performed by the at least one worker. For example, the edge module 310 may receive video data (e.g., video data 701) from camera 311. Referring to FIG. 13, for example, a computer device 1305 associated with (or implementing) an edge module (or edge apparatus) may receive video data via a user interface 1335 (or via a network 1350 and/or an I/O interface 1325) from a related input device such as a camera.

At 1222, the apparatus (e.g., the edge apparatus 1220) may execute, based on the received video data, a human action recognition program to identify at least one action associated with the at least one task. For example, the human action recognition program may be executed by the processor(s) 1310 (e.g., singly or in combination) or the edge analytics module 410 (or 420 or 430) implementing and/or including, e.g., HAR program 610 or 810. In some aspects, the identified at least one action may be associated with at least one of a hand of the at least one worker or a wrist of the at least one worker. The identified at least one action, in some aspects, may include one or more of reaching for an object, picking up the object, releasing the object, pushing the object, or twisting the object (as examples of possible actions, where other actions may be identified based on the particular task being performed by the human worker).

At 1223, the apparatus (e.g., the edge apparatus 1220) may execute, execute, based on the received video data, an object detection program to identify at least one object associated with the at least one task. For example, the object detection program may be executed by the processor(s) 1310 (e.g., singly or in combination) or the edge analytics module 410 (or 420 or 430) implementing and/or including, e.g., object detection program 620 or 820. In some aspects, the object may be one of a tool (e.g., a screwdriver, hammer, wrench, etc.), fastener (e.g., screw, dowel, nut/bolt, etc.), or part, (panel, housing, etc.) associated with the at least one task.

At 1224, the apparatus (e.g., the edge apparatus 1220) may identify, based on a combination of the identified at least one action and the identified at least one object associated with the at least one task, at least one subtask of the at least one task. For example, identifying the at least one subtask of the at least one task may be performed by the processor(s) 1310 (e.g., singly or in combination) or the edge analytics module 410 (or 420 or 430) including and/or implementing, e.g., the subtask identification program 630. In some aspects, to identify the at least one subtask of the at least one task, apparatus (e.g., edge apparatus 1220) may be configured to identify one of a beginning or an end of the at least one subtask based on a distance of the at least one of the hand of the at least one worker or the wrist of the at least one worker from at least one identified object.

At 1225, the apparatus (e.g., the edge apparatus 1220) may generate at least one label for the identified at least one subtask based on at least a first label associated with the at least one identified action from a first set of existing labels for identified actions and at least a second label associated with the identified at least one object from a second set of existing labels for identified objects. For example, the generating the at least one label may be performed by the processor(s) 1310 (e.g., singly or in combination) or the edge analytics module 410 (or 420 or 430) implementing, e.g., the subtask labelling module 411 (or 421, or 431) and/or the task identification process 640. In some aspects, the first set of existing labels and the second set of existing labels are stored in a memory associated with the apparatus (e.g., memory 1315, external storage 1345, or text DB 841).

At 1226, the apparatus (e.g., the edge apparatus 1220) may calculate a similarity score between the generated at least one label and a task description provided for the pre-defined task. For example, calculating the similarity score may be performed by the processor(s) 1310 (e.g., singly or in combination) or the edge analytics module 410 (or 420 or 430) including and/or implementing, e.g., task description evaluation module 650, task identification module 1040, BERT model 1012 or 1052, a pooling 1013 or 1053, a single vector representation 1014 and 1054 for each sentence respectively, calculating the cosine similarity 1055 between the two single vectors, and storing the similarity score 1056. The similarity score, in some aspects, may be calculated using any language model capable of assessing the similarity of phrases and or natural language descriptions of tasks or subtasks.

At 1227, the apparatus (e.g., the edge apparatus 1220) may determine whether to store or to discard the generated at least one label for further analysis based on the calculated similarity score. For example, the determination may be performed by the processor(s) 1310 (e.g., singly or in combination) or the edge analytics module 410 (or 420 or 430) including and/or implementing the determination at 660. In some aspects, the determination may include determining whether the similarity value is above or below a threshold value.

At 1231, the apparatus (e.g., the analysis apparatus 1230) may analyze a set of generated labels for subtasks of the at least one task for each of a plurality of workers performing the at least one task to determine the optimal subtask ordering associated with performing the at least one task. Referring to FIG. 13, for example, an additional computer device 1305 associated with (or implementing) an analysis module (or analysis apparatus), e.g., a set of additional processor(s) 1310 (e.g., singly or in combination) or the core analytics module 450 including and/or implementing the edge analytics module 410 (or 420 or 430), may analyze the set of generated labels. In some aspects, the analysis may compare information associated with different workers or different analyzed videos for a particular task (e.g., for a particular task 710) to determine an ordering of subtasks (e.g., subtask 761 or 762) associated with a minimum average time, a maximum number of parts produced per shift, or some other parameter used to optimize the particular task.

At 1232, the apparatus (e.g., the analysis apparatus 1230) may generate and store a modified video data associated with the at least one task performed by the at least one worker. For example, generating and storing the modified video data may be performed by the processor(s) 1310 (e.g., singly or in combination) or the core analytics module 450 including and/or implementing the edge analytics module 410 (or 420 or 430). The modified video data, in some aspects, may include the received video data and metadata indicating the generated at least one label and a timestamp associated with one or more of a beginning of the identified at least one subtask, an end of the identified at least one subtask, or a duration of the identified at least one subtask. In some aspects, the analysis apparatus may analyze the set of generated labels for the subtasks of the at least one task for each of the plurality of workers performing the at least one task by analyzing the modified video data. Storing the modified video data at 1232, in some aspects, may include providing the modified video data to a common memory associated with the analysis apparatus.

At 1233, the apparatus (e.g., the analysis apparatus 1230) may present, via a display, a visual representation of the optimal subtask ordering. For example, the presentation may be performed by the processor(s) 1310 (e.g., singly or in combination) or the core analytics module 450 including and/or implementing the edge analytics module 410 (or 420 or 430) via the I/O interface 1325 and/or output device/ interface 1340.

Worker training and identifying human errors are becoming increasingly important in the modern manufacturing landscape. To achieve these objectives, factories need to identify specific subtasks within larger tasks. Although tasks are well-defined within MES software, identifying subtasks can be difficult. Dividing tasks into specific time intervals is a common approach to subtask identification, but it may not always be effective since workers may perform subtasks at different intervals and in varying orders. Therefore, this novel approach provides a solution of automatically identifying subtask and provides suitable labels to each of the subtasks.

FIG. 13 illustrates an example computing environment with an example computer device suitable for use in some example implementations. Computer device 1305 in computing environment 1300 can include one or more processing units, cores, or processor(s) 1310, memory 1315 (e.g., RAM, ROM, and/or the like), internal storage 1320 (e.g., magnetic, optical, solid-state storage, and/or organic), and/ or V/O interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of the input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/ interface 1340 may include a display, television, monitor, printer, speaker, braille, or the like. In some example implementations, input/user interface 1335 and output device/ interface 1340 can be embedded with or physically coupled to the computer device 1305. In other example implementations, other computer devices may function as or provide the functions of input/user interface 1335 and output device/ interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, the input unit 1370, the output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide an output based on the calculations described in example implementations.

Processor(s) 1310 can be configured to receive video data associated with at least one task performed by at least one worker. The processor(s) 1310 can be configured to execute, based on the received video data, a human action recognition program to identify at least one action associated with the at least one task. The processor(s) 1310 can be configured to execute, based on the received video data, an object detection program to identify at least one object associated with the at least one task. The processor(s) 1310 can be configured to identify, based on a combination of the identified at least one action and the identified at least one object associated with the at least one task, at least one subtask of the at least one task. In some aspects, the processor(s) 1310 can also be configured to identify one of a beginning or an end of the at least one subtask based on a distance of the at least one of the hand of the at least one worker or the wrist of the at least one worker from at least one identified object. The processor(s) 1310 can be configured to generate at least one label for the identified at least one subtask based on at least a first label associated with the at least one identified action from a first set of existing labels for identified actions and at least a second label associated with the identified at least one object from a second set of existing labels for identified objects. In some aspects, the processor(s) 1310 can also be configured to calculate a similarity score between the generated at least one label and a task description provided for the pre-defined task. In some aspects, the processor(s) 1310 can also be configured to determine whether to store or discard the generated at least one label for further analysis based on the calculated similarity score.

In some aspects, e.g., when the computer device 1305 is associated with a video recording device, the processor(s) 1310 can be configured to record the video data associated with the at least one task performed by the at least one worker. In some aspects, the processor(s) 1310 can also be configured to provide, to the edge apparatus, the video data associated with the at least one task performed by the at least one worker.

For a computer device 1305 associated with an analysis apparatus or an edge apparatus, in some aspects, the processor(s) 1310 can be configured to analyze a set of generated labels for subtasks of the at least one task for each of a plurality of workers performing the at least one task to determine the optimal subtask ordering associated with performing the at least one task. The processor(s) 1310 can also be configured to present, via the display, a visual representation of the optimal subtask ordering. The processor(s) 1310 can also be configured to generate and store a modified video data associated with the at least one task performed by the at least one worker. The processor(s) 1310 can also be configured to analyze the set of generated labels for the subtasks of the at least one task for each of the plurality of workers performing the at least one task by analyzing the modified video data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

Clause 1. A system for automatically identifying subtasks, from video data associated with a task performed by one or more workers, and generating labels associated with identified subtasks and the video data, the system comprising: an edge apparatus comprising: a memory; and at least one processor coupled to the memory and, based at least in part on information stored in the memory, wherein the at least one processor is configured to: receive video data associated with at least one task performed by at least one worker; execute, based on the received video data, a human action recognition program to identify at least one action associated with the at least one task; execute, based on the received video data, an object detection program to identify at least one object associated with the at least one task; identify, based on a combination of the identified at least one action and the identified at least one object associated with the at least one task, at least one subtask of the at least one task; and generate at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory.

Clause 2. The system of clause 1, wherein the at least one task is a pre-defined task associated with an industrial process.

Clause 3. The system of clause 2, wherein the at least one processor of the edge apparatus is further configured to: calculate a similarity score between the generated at least one label and a task description provided for the pre-defined task; and determine whether to store or discard the generated at least one label for further analysis based on the calculated similarity score.

Clause 4. The system of clause 3, wherein the system is further for analyzing automatically-generated labels associated with the identified subtasks to identify an optimal subtask ordering associated with performing the at least one task, the system further comprising: a display; and an analysis apparatus comprising: a second memory; and a set of one or more processors coupled to the second memory and, based at least in part on information stored in the second memory, wherein the set of one or more processors is configured to: analyze a set of generated labels for subtasks of the at least one task for each of a plurality of workers performing the at least one task to determine the optimal subtask ordering associated with performing the at least one task; and present, via the display, a visual representation of the optimal subtask ordering.

Clause 5. The system of clause 4, wherein the at least one processor is further configured to: generate and store a modified video data associated with the at least one task performed by the at least one worker, wherein the modified video data comprises the received video data and metadata indicating the generated at least one label and a timestamp associated with one or more of a beginning of the identified at least one subtask, an end of the identified at least one subtask, or a duration of the identified at least one subtask, wherein the set of one or more processors of the analysis apparatus is configured to analyze the set of generated labels for the subtasks of the at least one task for each of the plurality of workers performing the at least one task by analyzing the modified video data.

Clause 6. The system of clause 5, wherein the edge apparatus is a first edge apparatus of a plurality of edge apparatuses associated with a corresponding plurality of workstations associated with the plurality of workers performing the at least one task, and wherein to store the modified video data, the at least one processor is configured to: provide the modified video data to a common memory associated with the analysis apparatus.

Clause 7. The system of clause 1, further comprising: a video recording device configured to: record the video data associated with the at least one task performed by the at least one worker; and provide, to the edge apparatus, the video data associated with the at least one task performed by the at least one worker.

Clause 8. The system of clause 1, wherein the identified at least one action is associated with at least one of a hand of the at least one worker or a wrist of the at least one worker.

Clause 9. The system of clause 8, wherein the identified at least one action comprises one or more of reaching for an object, picking up the object, releasing the object, pushing the object, or twisting the object.

Clause 10. The system of clause 9, wherein to identify the at least one subtask of the at least one task, the at least one processor of the edge apparatus is configured to identify one of a beginning or an end of the at least one subtask based on a distance of the at least one of the hand of the at least one worker or the wrist of the at least one worker from at least one identified object.

Clause 11. An apparatus for subtask identification, comprising: a memory; and at least one processor coupled to the memory and, based at least in part on information stored in the memory, the at least one processor is configured to: receive video data associated with at least one task performed by at least one worker; execute, based on the received video data, a human action recognition program to identify at least one action associated with the at least one task; execute, based on the received video data, an object detection program to identify at least one object associated with the at least one task; identify, based on a combination of the identified at least one action and the identified at least one object associated with the at least one task, at least one subtask of the at least one task; and generate at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory.

Clause 12. The apparatus of clause 11, wherein the at least one task is a pre-defined task associated with an industrial process.

Clause 13. The apparatus of clause 12, wherein the at least one processor is further configured to: calculate a similarity score between the generated at least one label and a task description provided for the pre-defined task; and determine whether to store or discard the generated at least one label for further analysis based on the calculated similarity score.

Clause 14. The apparatus of clause 13, wherein the apparatus is further for analyzing automatically-generated labels associated with the identified subtasks to identify an optimal subtask ordering associated with performing the at least one task, the apparatus further comprising: a display, wherein the at least one processor is further configured to: analyze a set of generated labels for subtasks of the at least one task for each of a plurality of workers performing the at least one task to determine the optimal subtask ordering associated with performing the at least one task; and present, via the display, a visual representation of the optimal subtask ordering.

Clause 15. The apparatus of clause 14, wherein the at least one processor is further configured to: generate and store a modified video data associated with the at least one task performed by the at least one worker wherein the modified video data comprises the received video data and metadata indicating the generated at least one label and a timestamp associated with one or more of a beginning of the identified at least one subtask, an end of the identified at least one subtask, or a duration of the identified at least one subtask, wherein the at least one processor is configured to analyze the set of generated labels for the subtasks of the at least one task for each of the plurality of workers performing the at least one task by analyzing the modified video data.

Clause 16. The apparatus of clause 15, wherein the apparatus is a first apparatus of a plurality of apparatuses associated with a corresponding plurality of workstations associated with the plurality of workers performing the at least one task, and wherein to store the modified video data, the at least one processor is configured to provide the modified video data to a common memory.

Clause 17. The apparatus of clause 11, wherein the identified at least one action is associated with at least one of a hand of the at least one worker or a wrist of the at least one worker.

Clause 18. The apparatus of clause 17, wherein the identified at least one action comprise one or more of reaching for an object, picking up the object, releasing the object, pushing the object, or twisting the object.

Clause 19. The apparatus of clause 18, wherein to identify the at least one subtask of the at least one task, the at least one processor is configured to identify one of a beginning or an end of the at least one subtask based on a distance of the at least one of the hand of the at least one worker or the wrist of the at least one worker from the at least one identified object.

Clause 20. A method for automatically identifying subtasks, from video data associated with a task performed by one or more workers, and generating labels associated with identified subtasks and the video data, comprising: receiving video data associated with at least one task performed by at least one worker; executing, based on the received video data, a human action recognition program to identify at least one action associated with the at least one task; executing, based on the received video data, an object detection program to identify at least one object associated with the at least one task; identifying, based on a combination of the identified at least one action and the identified at least one object associated with the at least one task, at least one subtask of the at least one task; and generating at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in at least one memory associated with the human action recognition program and the object detection program.

What is claimed is:

1. A system for automatically identifying subtasks, from video data associated with a task performed by one or more workers, and generating labels associated with identified subtasks and the video data, and analyzing automatically-generated labels associated with the identified subtasks to identify an optimal subtask ordering associated with performing at least one task, the system comprising:

a display;

an analysis apparatus;

an edge apparatus comprising:

a memory; and at least one processor coupled to the memory and, based at least in part on information stored in the memory, wherein the at least one processor is configured to:

receive video data associated with the at least one task performed by at least one worker, wherein the at least one task is a pre-defined task associated with an industrial process;

execute, based on the received video data, a human action recognition program to identify at least one action associated with the at least one task;

execute, based on the received video data, an object detection program to identify at least one object associated with the at least one task;

identify, based on a combination of the identified at least one action and the identified at least one object associated with the at least one task, at least one subtask of the at least one task;

generate at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory;

calculate a similarity score between the generated at least one label and a task description provided for the pre-defined task; and determine whether to store or discard the generated at least one label for further analysis based on the calculated similarity score;

the analysis apparatus comprising:

a second memory; and a set of one or more processors coupled to the second memory and, based at least in part on information stored in the second memory, wherein the set of one or more processors is configured to:

analyze a set of generated labels for subtasks of the at least one task for each of a plurality of workers performing the at least one task to determine the optimal subtask ordering associated with performing the at least one task; and present, via the display, a visual representation of the optimal subtask ordering.

2. The system of claim 1, wherein the at least one processor is further configured to:

generate and store a modified video data associated with the at least one task performed by the at least one worker, wherein the modified video data comprises the received video data and metadata indicating the generated at least one label and a timestamp associated with one or more of a beginning of the identified at least one subtask, an end of the identified at least one subtask, or a duration of the identified at least one subtask, wherein the set of one or more processors of the analysis apparatus is configured to analyze the set of generated labels for the subtasks of the at least one task for each of the plurality of workers performing the at least one task by analyzing the modified video data.

3. The system of claim 2, wherein the edge apparatus is a first edge apparatus of a plurality of edge apparatuses associated with a corresponding plurality of workstations associated with the plurality of workers performing the at least one task, and wherein to store the modified video data, the at least one processor is configured to:

provide the modified video data to a common memory associated with the analysis apparatus.

4. The system of claim 1, further comprising:

a video recording device configured to:

record the video data associated with the at least one task performed by the at least one worker; and provide, to the edge apparatus, the video data associated with the at least one task performed by the at least one worker.

5. The system of claim 1, wherein the identified at least one action is associated with at least one of a hand of the at least one worker or a wrist of the at least one worker.

6. The system of claim 5, wherein the identified at least one action comprises one or more of reaching for an object, picking up the object, releasing the object, pushing the object, lifting the object, carrying the object, pulling the object, or twisting the object.

7. The system of claim 6, wherein to identify the at least one subtask of the at least one task, the at least one processor of the edge apparatus is configured to identify one of a beginning or an end of the at least one subtask based on a distance of the at least one of the hand of the at least one worker or the wrist of the at least one worker from at least one identified object.

8. An apparatus for subtask identification and analyzing automatically-generated labels associated with identified subtasks to identify an optimal subtask ordering associated with performing at least one task, comprising:

a display, a memory; and at least one processor coupled to the memory and, based at least in part on information stored in the memory, the at least one processor is configured to:

receive video data associated with the at least one task performed by at least one worker, wherein the at least one task is a pre-defined task associated with an industrial process;

execute, based on the received video data, a human action recognition program to identify at least one action associated with the at least one task;

execute, based on the received video data, an object detection program to identify at least one object associated with the at least one task;

identify, based on a combination of the identified at least one action and the identified at least one object associated with the at least one task, at least one subtask of the at least one task;

generate at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the memory;

calculate a similarity score between the generated at least one label and a task description provided for the pre-defined task;

determine whether to store or discard the generated at least one label for further analysis based on the calculated similarity score;

analyze a set of generated labels for subtasks of the at least one task for each of a plurality of workers performing the at least one task to determine the optimal subtask ordering associated with performing the at least one task; and present, via the display, a visual representation of the optimal subtask ordering.

9. The apparatus of claim 8, wherein the at least one processor is further configured to:

generate and store a modified video data associated with the at least one task performed by the at least one worker wherein the modified video data comprises the received video data and metadata indicating the generated at least one label and a timestamp associated with one or more of a beginning of the identified at least one subtask, an end of the identified at least one subtask, or a duration of the identified at least one subtask, wherein the at least one processor is configured to analyze the set of generated labels for the subtasks of the at least one task for each of the plurality of workers performing the at least one task by analyzing the modified video data.

10. The apparatus of claim 9, wherein the apparatus is a first apparatus of a plurality of apparatuses associated with a corresponding plurality of workstations associated with the plurality of workers performing the at least one task, and wherein to store the modified video data, the at least one processor is configured to provide the modified video data to a common memory.

11. The apparatus of claim 8, wherein the identified at least one action is associated with at least one of a hand of the at least one worker or a wrist of the at least one worker.

12. The apparatus of claim 11, wherein the identified at least one action comprise one or more of reaching for an object, picking up the object, releasing the object, pushing the object, lifting the object, carrying the object, pulling the object, or twisting the object.

13. The apparatus of claim 12, wherein to identify the at least one subtask of the at least one task, the at least one processor is configured to identify one of a beginning or an end of the at least one subtask based on a distance of the at least one of the hand of the at least one worker or the wrist of the at least one worker from the at least one identified object.

14. A method for automatically identifying subtasks, from video data associated with a task performed by one or more workers, and generating labels associated with identified subtasks and the video data, and analyzing automatically-generated labels associated with identified subtasks to identify an optimal subtask ordering associated with performing at least one task, comprising:

at least one processor coupled to at least one memory and, based at least in part on information stored in the at least one memory, the at least one processor is configured to perform the steps of:

receiving video data associated with the at least one task performed by at least one worker, wherein the at least one task is a pre-defined task associated with an industrial process;

executing, based on the received video data, a human action recognition program to identify at least one action associated with the at least one task;

executing, based on the received video data, an object detection program to identify at least one object associated with the at least one task;

identifying, based on a combination of the identified at least one action and the identified at least one object associated with the at least one task, at least one subtask of the at least one task;

generating at least one label for the identified at least one subtask based on at least a first label associated with the at least one identified action from a first set of existing labels for identified actions and at least a second label associated with the identified at least one object from a second set of existing labels for identified objects, wherein the first set of existing labels and the second set of existing labels are stored in the at least one memory associated with the human action recognition program and the object detection program;

calculating a similarity score between the generated at least one label and a task description provided for the pre-defined task;

determining whether to store or discard the generated at least one label for further analysis based on the calculated similarity score;

analyzing a set of generated labels for subtasks of the at least one task for each of a plurality of workers performing the at least one task to determine the optimal subtask ordering associated with performing the at least one task; and presenting, via a display, a visual representation of the optimal subtask ordering.

\* \* \* \* \*